US012596048B2

(12) United States Patent　　　(10) Patent No.:　US 12,596,048 B2
　　Cheng et al.　　　　　　　　　(45) Date of Patent:　　　Apr. 7, 2026

(54) OIL LEAKAGE DETECTION METHOD OF MIRCROPHONE CIRCUIT, MIRCROPHONE CIRCUIT, MIRCROPHONE AND ELECTRONIC PRODUCT

(71) Applicant: Shenzhen Chiptech Electronics Co., Ltd, Shenzhen (CN)

(72) Inventors: Xiaozhong Cheng, Shenzhen (CN); Yanxu Cheng, Shenzhen (CN)

(73) Assignee: Shenzhen Chiptech Electronics Co., Ltd, Shenzhen (CN)

( * ) Notice: Subject to any disclaimer, the term of this patent is extended or adjusted under 35 U.S.C. 154(b) by 542 days.

(21) Appl. No.: 18/156,137

(22) Filed: Jan. 18, 2023

(65) Prior Publication Data

US 2024/0035917 A1　　Feb. 1, 2024

Related U.S. Application Data

(63) Continuation of application No. PCT/CN2022/109506, filed on Aug. 1, 2022.

(30) Foreign Application Priority Data

Aug. 1, 2022　(CN) ......................... 202210918507.X

(51) Int. Cl.
*G01M 3/16*　　　　(2006.01)
(52) U.S. Cl.
CPC ..................................... *G01M 3/16* (2013.01)
(58) Field of Classification Search
CPC ....................... G01M 3/16; H04R 29/004–006
See application file for complete search history.

(56) References Cited

U.S. PATENT DOCUMENTS

2021/0195311 A1* 6/2021 Jiao ...................... H04R 1/1041
2021/0195341 A1* 6/2021 Miehl .................. H04R 29/004

FOREIGN PATENT DOCUMENTS

CN　　205178665 U　　4/2016
CN　　207117875 U　　3/2018
CN　　212064348 U　　12/2020

\* cited by examiner

*Primary Examiner* — Alexander A Mercado
(74) *Attorney, Agent, or Firm* — Nitin Kaushik

(57)　　　　　　ABSTRACT

The present invention relates to an oil leakage detection method of a microphone circuit, a microphone circuit, a microphone and an electronic product. The oil leakage detection method of a microphone circuit includes: detecting an equivalent resistance and/or equivalent voltage in an environment where the microphone circuit is located through an oil leakage detection pin arranged on a microphone circuit package; determining whether the equivalent resistance and/or equivalent voltage exceeds a corresponding preset value through a detection circuit arranged in the microphone circuit package; and outputting a signal for stopping operation of the microphone circuit when the equivalent resistance and/or equivalent voltage exceeds the preset value. Adoption of the present invention can ensure that the detection circuit can normally work when an oil leakage accident occurs in the environment where the microphone circuit package is located, thereby reducing potential safety hazards of the electronic product.

10 Claims, 11 Drawing Sheets

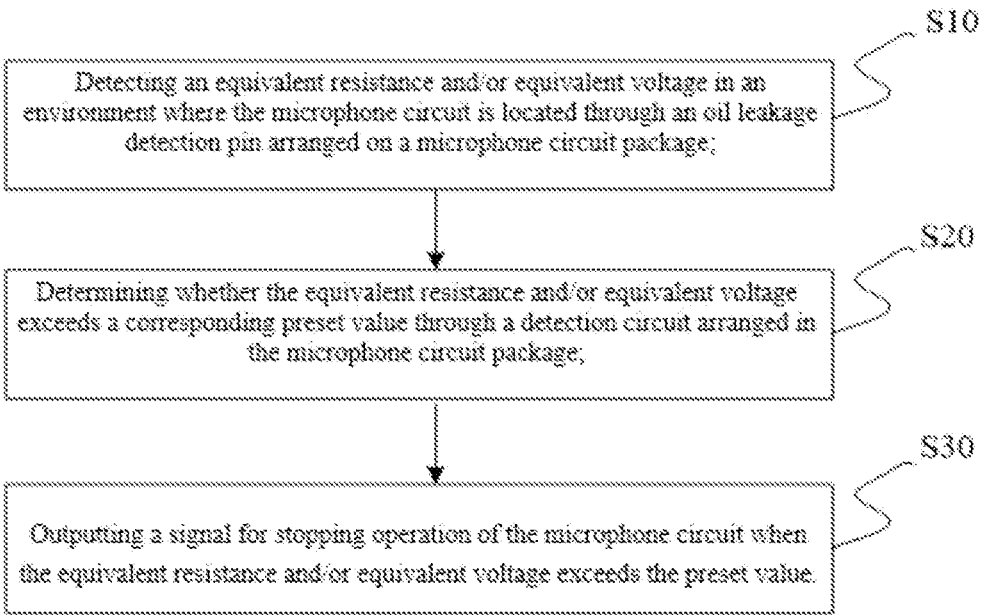

S10

Detecting an equivalent resistance and/or equivalent voltage in an environment where the microphone circuit is located through an oil leakage detection pin arranged on a microphone circuit package;

S20

Determining whether the equivalent resistance and/or equivalent voltage exceeds a corresponding preset value through a detection circuit arranged in the microphone circuit package;

S30

Outputting a signal for stopping operation of the microphone circuit when the equivalent resistance and/or equivalent voltage exceeds the preset value.

FIG.1

OIL LEAKAGE DETECTION METHOD OF MIRCROPHONE CIRCUIT, MIRCROPHONE CIRCUIT, MIRCROPHONE AND ELECTRONIC PRODUCT

CROSS-REFERENCE TO RELATED APPLICATIONS

The application claims priority to Chinese patent application No. 202210918507.X, filed on Aug. 1, 2022, the entire contents of which are incorporated herein by reference.

TECHNICAL FIELD

The present invention relates to the field of microphone technology, and more particularly, to an oil leakage detection method of a microphone circuit, a microphone circuit, a microphone and an electronic product.

BACKGROUND

Microphone is one of core components of electronic products such as electronic cigarettes. The overall working principle of the electronic cigarette using a microphone switch is summarized as follows: a user inhales—an airflow sensor (microphone) makes response—a control circuit is triggered—an atomizer starts working—steam is generated. When stop inhaling, air flow in the sensor disappears, an airflow sensing switch is off, a control module of the control circuit stops working, and the atomizer stops working. As compared to a key switch, the microphone switch enables the electronic cigarette to be more intelligent, and simpler and convenient in operation, and is more suitable for small cigarette with small power.

However, when the electronic cigarette has oil leakage, oil droplets can enter into inside of the microphone, so that the electronic cigarette is false triggered, causing unnecessary safety accidents.

As for the industrial problem, currently, there is no good solution.

SUMMARY

With respect to deficiencies in the prior art, the technical problem to be solved by the present invention is to provide an oil leakage detection method of a microphone circuit, and further provide a microphone circuit, a microphone and an electric product.

In the present invention, an oil leakage detection method of a microphone circuit, comprises:

detecting an equivalent resistance and/or equivalent voltage in an environment where the microphone circuit is located through an oil leakage detection pin arranged on a microphone circuit package;

determining whether the equivalent resistance and/or equivalent voltage exceeds a corresponding preset value through a detection circuit arranged in the microphone circuit package; and outputting a signal for stopping operation of the microphone circuit when the equivalent resistance and/or equivalent voltage exceeds the preset value.

According to the oil leakage detection method of the present invention, the step of detecting the equivalent resistance and/or equivalent voltage in the environment where the microphone circuit is located through the oil leakage detection pin arranged on the microphone circuit package particularly comprises:

arranging the oil leakage detection pin on the microphone circuit package;

applying discontinuous or continuous electrical signals to the oil leakage detection pin; and reading electrical signals fed back from the oil leakage detection pin through the detection circuit arranged in the microphone circuit package, so as to obtain the equivalent resistance and/or equivalent voltage in the environment where the microphone circuit package is located.

According to the oil leakage detection method of the present invention, the step of reading the electrical signals fed back from the oil leakage detection pin particularly comprises:

reading electrical signals between the oil leakage detection pin and ground; and/or reading electrical signals between the oil leakage detection pin and a power source.

According to the oil leakage detection method of the present invention, the step of determining whether the equivalent resistance and/or equivalent voltage exceeds the corresponding preset value particularly comprises:

determining whether the equivalent resistance and/or equivalent voltage exceeds the corresponding preset value by employing a voltage detection comparator or a current comparator.

In the present invention, a microphone circuit, comprises an oil leakage detection unit circuit that comprises:

an oil leakage detection pin arranged on a microphone circuit package, for detecting an equivalent resistance and/or equivalent voltage in an environment where the microphone circuit package is located; and a detection circuit arranged in the microphone circuit package and electrically connected to the oil leakage detection pin, for determining whether the equivalent resistance and/or equivalent voltage exceeds a corresponding preset value, and outputting a signal for stopping operation of the microphone circuit when the equivalent resistance and/or equivalent voltage exceeds the preset value.

According to the microphone circuit of the present invention, the oil leakage detection pin is applied with discontinuous or continuous electrical signals.

According to the microphone circuit of the present invention, the detection circuit is a voltage detection comparator or a current comparator.

According to the microphone circuit of the present invention, the oil leakage detection pin is multiplexed with a charging pin of the microphone circuit.

In the present invention, a microphone is arranged with the microphone circuit according to any of the preceding claims.

In the present invention, an electronic product is arranged with the microphone according to any of the preceding claims.

Advantageous effects of the present invention are to ensure that the detection circuit can normally work when an oil leakage accident occurs in the environment where the microphone circuit package is located by arranging the oil leakage detection pin on the microphone circuit package, while arranging the detection circuit in the microphone circuit package, so that not only change of the equivalent resistance and/or equivalent voltage in the environment can be detected, but also it is ensured that the microphone circuit is controlled to stop operation according to the change of the equivalent resistance and/or equivalent voltage, thereby preventing safety accidents caused due to still powering on of the electronic product in the case of oil leakage, and reducing potential safety hazards of the electronic product.

BRIEF DESCRIPTION OF THE DRAWINGS

In order to clearly explain the examples of the present invention or the technical solution in the prior art, herein-after the present invention is further explained in accompa-nying with the drawings and the embodiments, and the drawings in the below description are only a part of embodi-ments of the present invention. For those of ordinary skill in the art, other accompanying drawings can be obtained according to these accompanying drawings without creative effort:

FIG. 1 is a flow diagram of an oil leakage detection method of a microphone circuit according to a preferable embodiment of the present invention;

DETAILED DESCRIPTION OF THE EMBODIMENT

Figure 2A:
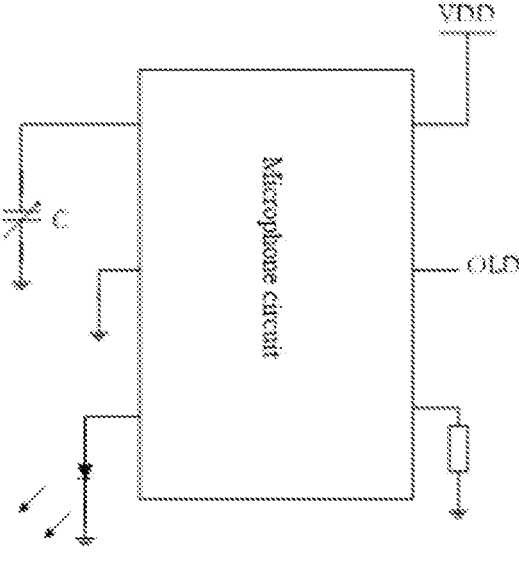
FIG. 2a is a principle diagram I of a microphone circuit according to a preferable embodiment of the present inven-tion.

In order to make the objects, technical solutions and advantages of the embodiments of the present invention clearer, hereinafter clear and complete description will be made for the technical solution in the embodiments of the present invention. Apparently, the described embodiments are a part of embodiments of the present invention, not all embodiments. All other embodiments obtained by those of ordinary skill in the art without any creative effort based on the embodiments in the present invention fall into the scope of the present invention.

In the embodiments of the present invention, an oil leakage detection method of a microphone circuit is pro-vided, as shown in FIG. 1, comprising:

S10: detecting an equivalent resistance and/or equivalent voltage in an environment where the microphone cir-cuit is located through an oil leakage detection pin arranged on a microphone circuit package;

S20: determining whether the equivalent resistance and/or equivalent voltage exceeds a corresponding preset value through a detection circuit arranged in the micro-phone circuit package; and S30: outputting a signal for stopping operation of the microphone circuit when the equivalent resistance and/ or equivalent voltage exceeds the preset value.

When oil leakage phenomenon does not occur outside the microphone circuit package, it corresponds to grounding at the oil leakage detection pin, and voltage is 0V. When oil leakage phenomenon occurs outside the microphone circuit package, it corresponds to externally connecting "a load" at the oil leakage detection pin. The equivalent resistance value of the "load" varies depending on specific conditions of the leaked oil droplets, the voltage value on the oil leakage detection pin changes, and the voltage comparator outputs such change to a suction detection unit circuit or other circuits of the microphone circuit through an output end, and then controls the microphone circuit to stop working, thereby avoiding occurrence of various dangerous accidents caused due to oil leakage.

The present invention can ensure that the detection circuit can normally work when an oil leakage accident occurs in the environment where the microphone circuit package is located by arranging the oil leakage detection pin on the microphone circuit package, while arranging the detection circuit in the microphone circuit package, so that not only change of the equivalent resistance and/or equivalent volt-age in the environment can be detected, but also it is ensured that the microphone circuit is controlled to stop operation according to the change of the equivalent resistance and/or equivalent voltage, thereby preventing safety accidents caused due to still powering on of the electronic product in the case of oil leakage, and reducing potential safety hazards of the electronic product.

In a further embodiment of the present invention, the step of detecting the equivalent resistance and/or equivalent voltage in the environment where the microphone circuit is located through the oil leakage detection pin arranged on the microphone circuit package in the oil leakage detection method particularly comprises:

arranging the oil leakage detection pin on the microphone circuit package;

applying discontinuous or continuous electrical signals to the oil leakage detection pin; and reading electrical signals fed back from the oil leakage detection pin through the detection circuit arranged in the microphone circuit package, so as to obtain the equivalent resistance and/or equivalent voltage in the environment where the microphone circuit package is located.

In a further embodiment of the present invention, the step of reading the electrical signals fed back from the oil leakage detection pin in the oil leakage detection method particularly comprises:

reading electrical signals between the oil leakage detec-tion pin and ground; and/or reading electrical signals between the oil leakage detec-tion pin and a power source.

In a further embodiment of the present invention, the step of determining whether the equivalent resistance and/or equivalent voltage exceeds the corresponding preset value in the oil leakage detection method particularly comprises:

determining whether the equivalent resistance and/or equivalent voltage exceeds the corresponding preset value by employing a voltage detection comparator or a current comparator. The preset value can be set to be a possible range of the equivalent resistance values of the oil droplets such as 1 KΩ–1 MΩ, 1 KΩ-200 K, 50 KΩ-200 KΩ . . . , or a range of the equivalent voltage values calculated according to the range of the equivalent resistance values. The preset value may have some changes due to different solutions of the microphone circuit and the environments thereof, but it shall be considered to fall into the scope of the present invention.

In a further embodiment of the present invention, a microphone circuit comprises an oil leakage detection unit circuit, and uses the oil leakage detection method.

Figure 2B:
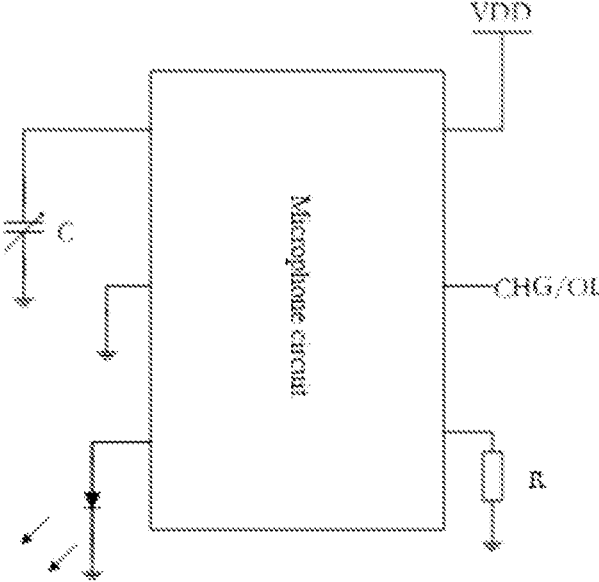
FIG. 2b is a principle diagram II of a microphone circuit according to a preferable embodiment of the present inven-tion.

As shown in FIGS. 2a and 2b, the oil leakage detection unit circuit comprises:

an oil leakage detection pin arranged on a microphone circuit package, for detecting an equivalent resistance and/or equivalent voltage in an environment where the microphone circuit package is located; and a detection circuit arranged in the microphone circuit package and electrically connected to the oil leakage detection pin, for determining whether the equivalent resistance and/or equivalent voltage exceeds a corresponding preset value, and outputting a signal for stopping operation of the microphone circuit when the equivalent resistance and/or equivalent voltage exceeds the preset value.

The microphone circuit of the present invention can ensure that the detection circuit can normally work when an oil leakage accident occurs in the environment where the microphone circuit package is located by arranging the oil leakage detection pin on the microphone circuit package, while arranging the detection circuit in the microphone circuit package, so that not only change of the equivalent resistance and/or equivalent voltage in the environment can be detected, but also it is ensured that the microphone circuit is controlled to stop operation according to the change of the equivalent resistance and/or equivalent voltage, thereby preventing safety accidents caused due to still powering on of the electronic product in the case of oil leakage, and reducing potential safety hazards of the electronic product.

Further, in the microphone circuit, discontinuous or continuous electrical signals such as pulse signals are applied to the oil leakage detection pin.

Further, in the microphone circuit, as shown in FIG. 2b, the oil leakage detection pin is multiplexed with a charging pin of the microphone circuit. In this way, an internal detection circuit can be directly added on the basis of a six-pin package of the original microphone circuit, so the object of oil leakage detection can be achieved, and adverse consequences of an increase of package size and cost of the microphone circuit caused due to adding of the pin can be avoided.

Further, the detection circuit in the microphone circuit is a voltage detection comparator or a current comparator, or other forms of circuits with the same function, as shown in FIGS. 3-10.

Example I

Figure 3:
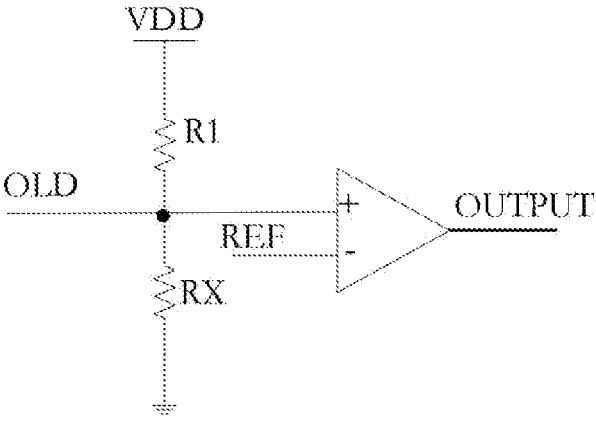
FIG. 3 is a circuit diagram of solution I of a voltage detection comparator for oil leakage detection according to another preferable embodiment of the present invention.
Figure 4:
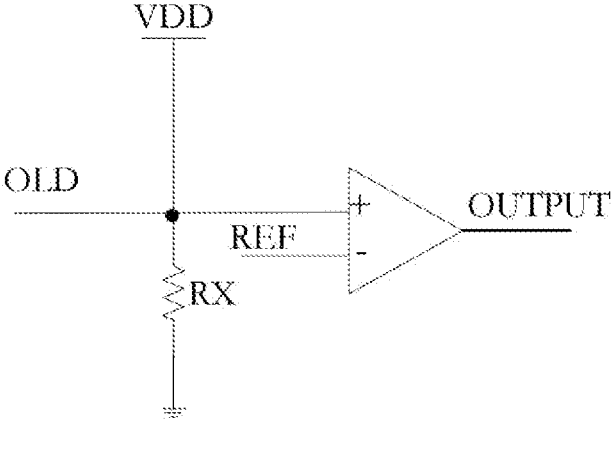
FIG. 4 is a circuit diagram of solution II of a voltage detection comparator for oil leakage detection according to another preferable embodiment of the present invention.

As shown in FIGS. 3 and 4, please also refer to FIGS. 2a and 2b, the detection circuit in the microphone circuit is a voltage detection comparator circuit, comprising an input end oil leakage detection pin OLD and an output end OUTPUT. The oil leakage detection pin OLD is arranged on a microphone circuit package, and multiplexed with a charging pin CHG of the microphone circuit for detecting whether oil leakage occurs outside the microphone circuit package, and the voltage comparator and its output end are arranged inside the microphone circuit package to ensure normal working in an oil leakage state.

When the microphone circuit normally works, electrical signals are applied to the oil leakage detection pin OLD while reading a voltage value of the pin, another input end of the voltage comparator is connected to a reference voltage REF, and a result is outputted after comparison of the voltage comparator. When an oil leakage phenomenon does not occur outside the microphone circuit package, it corresponds to grounding at the oil leakage detection pin OLD, and voltage is 0V. When the oil leakage phenomenon occurs outside the microphone circuit package, it corresponds to externally connecting "a load" at the oil leakage detection pin OLD. The equivalent resistance value RX of the "load" varies depending on specific conditions of the leaked oil droplets, the voltage value on the oil leakage detection pin OLD changes, and the voltage comparator outputs such change to a suction detection unit circuit or other circuits of the microphone circuit through the output end OUTPUT, and then controls the microphone circuit to stop working, thereby avoiding occurrence of various dangerous accidents caused due to oil leakage.

In this process, since the voltage comparator circuit is arranged inside the microphone circuit package, even if oil leakage accident occurs in the environment, the internal circuits can also normally work. Thus, as compared to various oil leakage detection or prevention ways in the prior art, the technical method in the example is more reliable, and greatly improves safety of the microphone circuit, thereby further improving safety of the electronic product using the microphone circuit. Therefore, the effects of the oil leakage detection method and circuit in the example are quite significant.

Moreover, since the oil leakage detection pin OLD in the example is multiplexed with the charging pin CHG of the microphone circuit, it is unnecessary to add additional pins, and the microphone circuit can follow a structure of the six-pin package, thereby avoiding an increase of cost of the microphone circuit caused due to an increase of package size, thus, the oil leakage detection method and circuit in the example have large practicability.

Example II

Figure 5:
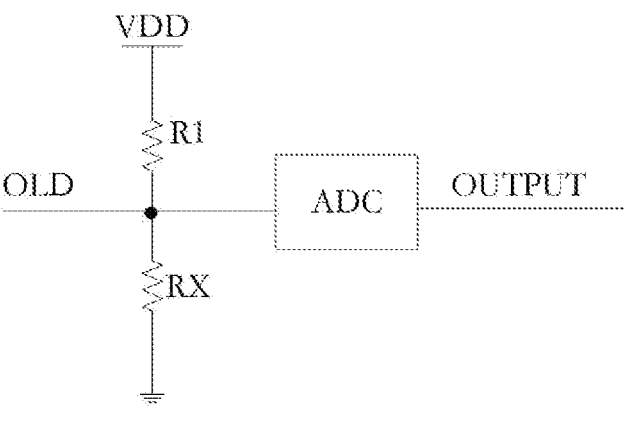
FIG. 5 is a circuit diagram of solution I of a voltage detection ADC in an oil leakage detection circuit according to another preferable embodiment of the present invention.
Figure 6:
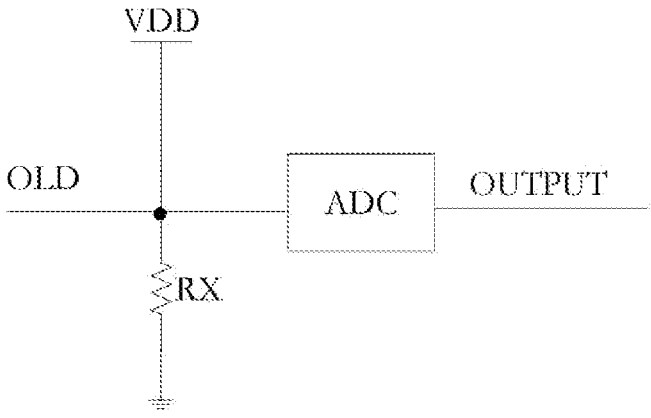
FIG. 6 is a circuit diagram of solution II of a voltage detection ADC in the oil leakage detection circuit according to another preferable embodiment of the present invention.

As shown in FIGS. 5 and 6, please also refer to FIGS. 2a and 2b, the detection circuit in the microphone circuit is a voltage detection ADC circuit, comprising an input end oil leakage detection pin OLD and an output end OUTPUT. The oil leakage detection pin OLD is arranged on the microphone circuit package, and multiplexed with a charging pin CHG of the microphone circuit for detecting whether oil leakage occurs outside the microphone circuit package, and the voltage detection ADC circuit and its output end are arranged inside the microphone circuit package to ensure normal working in an oil leakage state.

When the microphone circuit normally works, electrical signals are applied to the oil leakage detection pin OLD while reading a voltage value of the pin, and a result is outputted after comparison of the voltage detection ADC circuit. When an oil leakage phenomenon does not occur outside the microphone circuit package, it corresponds to grounding at the oil leakage detection pin OLD, and voltage is 0V. When the oil leakage phenomenon occurs outside the microphone circuit package, it corresponds to externally connecting "a load" at the oil leakage detection pin OLD. The equivalent resistance value RX of the "load" varies depending on specific conditions of the leaked oil droplets, the voltage value on the oil leakage detection pin OLD changes, and the voltage detection ADC circuit outputs such change to a suction detection unit circuit or other circuits of the microphone circuit through the output end OUTPUT, and then controls the microphone circuit to stop working, thereby avoiding occurrence of various dangerous accidents caused due to oil leakage.

In this process, since the voltage detection ADC circuit is arranged inside the microphone circuit package, even if oil leakage accident occurs in the environment, the internal circuits can also normally work. Thus, as compared to various oil leakage detection or prevention ways in the prior art, the technical method in the example is more reliable, and greatly improves safety of the microphone circuit, thereby further improving safety of the electronic product using the microphone circuit. Therefore, the effects of the oil leakage detection method and circuit in the example are quite significant.

Moreover, since the oil leakage detection pin OLD in the example is multiplexed with the charging pin CHG of the microphone circuit, it is unnecessary to add additional pins, and the microphone circuit can follow a structure of the six-pin package, thereby avoiding an increase of cost of the microphone circuit caused due to an increase of package size, thus, the oil leakage detection method and circuit in the example have large practicability.

Example III

Figure 7:
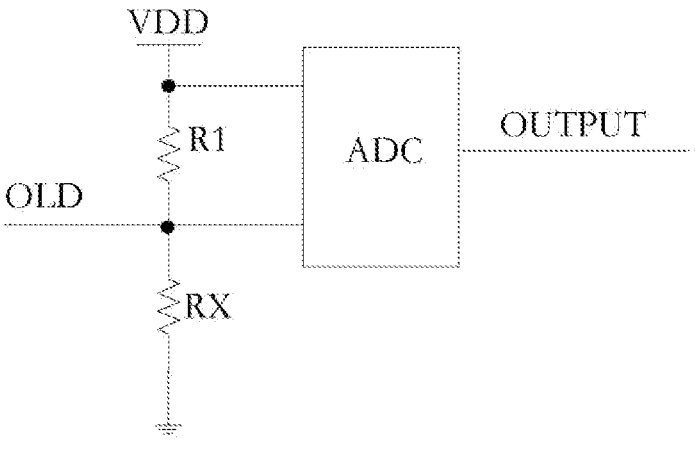
FIG. 7 is a circuit diagram of solution I of a current detection ADC in the oil leakage detection circuit according to another preferable embodiment of the present invention.

As shown in FIG. 7, please also refer to FIGS. 2a and 2b, the detection circuit in the microphone circuit is a current detection ADC circuit, comprising a first input end oil leakage detection pin OLD, a second input end connected to a power source VDD, an output end OUTPUT, and a fixed resistor RI arranged between the two input ends. The oil leakage detection pin OLD is arranged on the microphone circuit package, and multiplexed with a charging pin CHG of the microphone circuit for detecting whether oil leakage occurs outside the microphone circuit package, and the current detection ADC circuit and its output end are arranged inside the microphone circuit package to ensure normal working in an oil leakage state.

When the microphone circuit normally works, electrical signals are applied to the oil leakage detection pin OLD while reading a current value of the pin, and a result is outputted after processing of the current detection ADC circuit. When an oil leakage phenomenon does not occur outside the microphone circuit package, it corresponds to grounding at the oil leakage detection pin OLD, and current is 0V. When the oil leakage phenomenon occurs outside the microphone circuit package, it corresponds to externally connecting "a load" at the oil leakage detection pin OLD. The equivalent resistance value RX of the "load" varies depending on specific conditions of the leaked oil droplets, the current value on the oil leakage detection pin OLD changes, and the current detection ADC circuit outputs such change to a suction detection unit circuit or other circuits of the microphone circuit through the output end OUTPUT, and then controls the microphone circuit to stop working, thereby avoiding occurrence of various dangerous accidents caused due to oil leakage.

In this process, since the current detection ADC circuit is arranged inside the microphone circuit package, even if oil leakage accident occurs in the environment, the internal circuits can also normally work. Thus, as compared to various oil leakage detection or prevention ways in the prior art, the technical method in the example is more reliable, and greatly improves safety of the microphone circuit, thereby further improving safety of the electronic product using the microphone circuit. Therefore, effects brought by the oil leakage detection method and circuit in the example are quite significant.

Moreover, since the oil leakage detection pin OLD in the example is multiplexed with the charging pin CHG of the microphone circuit, it is unnecessary to add additional pins, and the microphone circuit can follow a structure of the six-pin package, thereby avoiding an increase of cost of the microphone circuit caused due to an increase of package size, thus, the oil leakage detection method and circuit in the example have large practicability.

Example IV

Figure 8:
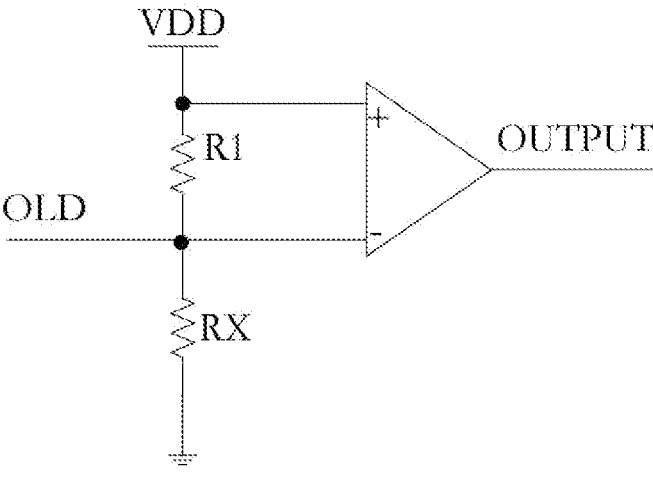
FIG. 8 is a circuit diagram of solution II of a current detection ADC in the oil leakage detection circuit according to another preferable embodiment of the present invention.

As shown in FIG. 8, please also refer to FIGS. 2a and 2b, the detection circuit in the microphone circuit is a current comparator circuit, comprising a first input end oil leakage detection pin OLD, a second input end connected to a power source VDD of the microphone circuit, an output end OUTPUT, and a fixed resistor R 1 arranged between the two input ends. The oil leakage detection pin OLD is arranged on the microphone circuit package, and multiplexed with a charging pin CHG of the microphone circuit for detecting whether oil leakage occurs outside the microphone circuit package, and the current comparator circuit and its output end are arranged inside the microphone circuit package to ensure normal working in an oil leakage state.

When the microphone circuit normally works, electrical signals are applied to the oil leakage detection pin OLD while reading a current value of the pin, and a result is outputted after processing of the current comparator circuit. When an oil leakage phenomenon does not occur outside the microphone circuit package, it corresponds to grounding at the oil leakage detection pin OLD, and current is 0V. When the oil leakage phenomenon occurs outside the microphone circuit package, it corresponds to externally connecting "a load" at the oil leakage detection pin OLD. The equivalent resistance value RX of the "load" varies depending on specific conditions of the leaked oil droplets, the current value on the oil leakage detection pin OLD changes, and the current comparator circuit outputs such change to a suction detection unit circuit or other circuits of the microphone circuit through the output end OUTPUT, and then controls the microphone circuit to stop working, thereby avoiding occurrence of various dangerous accidents caused due to oil leakage.

In this process, since the current comparator circuit is arranged inside the microphone circuit package, even if oil leakage accident occurs in the environment, the internal circuits can also normally work. Thus, as compared to various oil leakage detection or prevention ways in the prior art, the technical method in the example is more reliable, and greatly improves safety of the microphone circuit, thereby further improving safety of the electronic product using the microphone circuit. Therefore, the effects of the oil leakage detection method and circuit in the example are quite significant.

Moreover, since the oil leakage detection pin OLD in the example is multiplexed with the charging pin CHG of the microphone circuit, it is unnecessary to add additional pins, and the microphone circuit can follow a structure of the six-pin package, thereby avoiding an increase of cost of the microphone circuit caused due to an increase of package size, thus, the oil leakage detection method and circuit in the example have large practicability.

Example V

Figure 9:
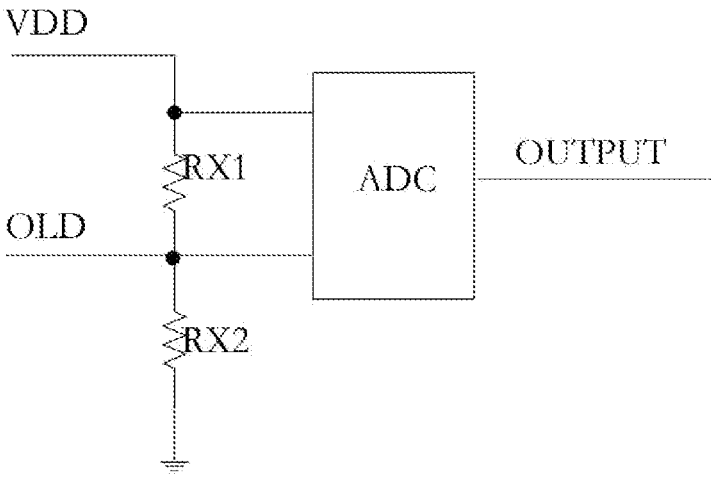
FIG. 9 is a circuit diagram of the ADC solution when VDD and CHG in the oil leakage detection circuit have oil leakage according to a preferable embodiment of the present invention.

As shown in FIG. 9, please also refer to FIGS. 2a and 2b, the detection circuit in the microphone circuit is a current detection ADC circuit, comprising a first input end oil leakage detection pin OLD, a second input end connected to a power source VDD, and an output end OUTPUT. The oil leakage detection pin OLD is arranged on the microphone circuit package, and multiplexed with a charging pin CHG of the microphone circuit for detecting whether oil leakage occurs outside the microphone circuit package, and the current detection ADC circuit and its output end are arranged inside the microphone circuit package to ensure normal working in an oil leakage state.

When the microphone circuit normally works, electrical signals are applied to the first input end oil leakage detection pin OLD while reading a current value of the pin. Meanwhile, electrical signals are applied to the second input end while reading a current value of the pin. Ater the signal at the two input ends is processed by the current detection ADC circuit, a result is outputted.

When an oil leakage phenomenon does not occur outside the microphone circuit package, it corresponds to grounding at the oil leakage detection pin OLD, and current is 0V. When the oil leakage phenomenon occurs outside the microphone circuit package, and VDD and CHG of the microphone circuit have oil leakage, it corresponds to externally connecting "a load" at the first input end oil leakage detection pin OLD, and it also corresponds to externally connecting "a load" at the pin of the second input end power source VDD. The equivalent resistance values RX1 and RX2 of the two "loads" vary depending on specific conditions of the leaked oil droplets, the current values at the two input ends change, and the current detection ADC circuit outputs such change to a suction detection unit circuit or other circuits of the microphone circuit through the output end OUTPUT, and then controls the microphone circuit to stop working, thereby avoiding occurrence of various dangerous accidents caused due to oil leakage.

In this process, since the current detection ADC circuit is arranged inside the microphone circuit package, even if oil leakage accident occurs in the environment, the internal circuits can also normally work. Thus, as compared to various oil leakage detection or prevention ways in the prior art, the technical method in the example is more reliable, and greatly improves safety of the microphone circuit, thereby further improving safety of the electronic product using the microphone circuit. Therefore, the effects of the oil leakage detection method and circuit in the example are quite significant.

Moreover, since the oil leakage detection pin OLD in the example is multiplexed with the charging pin CHG of the microphone circuit, it is unnecessary to add additional pins, and the microphone circuit can follow a structure of the six-pin package, thereby avoiding an increase of cost of the microphone circuit caused due to an increase of package size, thus, the oil leakage detection method and circuit in the example have large practicability.

Example VI

Figure 10:
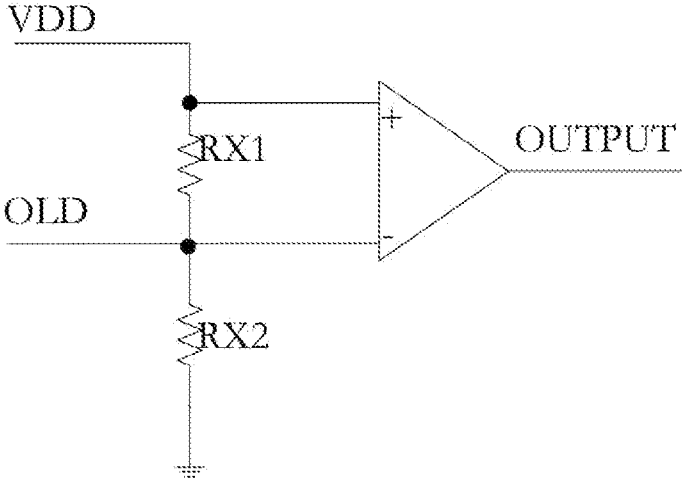
FIG. 10 is a circuit diagram of the comparator solution when VDD and CHG in the oil leakage detection circuit have oil leakage according to a preferable embodiment of the present invention.

As shown in FIG. 10, please also refer to FIGS. 2a and 2b, the detection circuit in the microphone circuit is a voltage comparator, comprising a first input end oil leakage detection pin OLD, a second input end connected to a power source VDD, and an output end OUTPUT. The oil leakage detection pin OLD is arranged on the microphone circuit package, and multiplexed with a charging pin CHG of the microphone circuit for detecting whether oil leakage occurs outside the microphone circuit package, and the voltage comparator and its output end are arranged inside the microphone circuit package to ensure normal working in an oil leakage state.

When the microphone circuit normally works, electrical signals are applied to the first input end oil leakage detection pin OLD while reading a voltage value of the pin. Meanwhile, electrical signals are applied to the second input end while reading a voltage value of the pin. After the signal at the two input ends is processed through the voltage comparator, a result is outputted.

When an oil leakage phenomenon does not occur outside the microphone circuit package, it corresponds to grounding at the oil leakage detection pin OLD, and voltage is 0V. When the oil leakage phenomenon occurs outside the microphone circuit package, and VDD and CHG of the microphone circuit have oil leakage, it corresponds to externally connecting "a load" at the first input end oil leakage detection pin OLD, and it also corresponds to externally connecting "a load" at the pin of the second input end power source VDD. The equivalent resistance values RX1 and RX2 of the two "loads" vary depending on specific conditions of the leaked oil droplets, the voltage values at the two input ends change, and the voltage comparator outputs such change to a suction detection unit circuit or other circuits of the microphone circuit through the output end OUTPUT, and then controls the microphone circuit to stop working, thereby avoiding occurrence of various dangerous accidents caused due to oil leakage.

In this process, since the voltage comparator circuit is arranged inside the microphone circuit package, even if oil leakage accident occurs in the environment, the internal circuits can also normally work. Thus, as compared to various oil leakage detection or prevention ways in the prior art, the technical method in the example is more reliable, and greatly improves safety of the microphone circuit, thereby further improving safety of the electronic product using the microphone circuit. Therefore, the effects of the oil leakage detection method and circuit in the example are quite significant.

Moreover, since the oil leakage detection pin OLD in the example is multiplexed with the charging pin CHG of the microphone circuit, it is unnecessary to add additional pins, and the microphone circuit can follow a structure of the six-pin package, thereby avoiding an increase of cost of the microphone circuit caused due to an increase of package size, thus, the oil leakage detection method and circuit in the example have large practicability.

In a further embodiment of the present invention, a microphone is arranged with the microphone circuit in any of the examples, or a microphone circuit article including the microphone circuit.

In a further embodiment of the present invention, an electronic product is arranged with the microphone in any of the examples. Moreover, the electronic product is not limited to the electronic cigarette, but can also be other electronic products using the microphone.

In conclusion, the present invention can ensure that the detection circuit can normally work when an oil leakage accident occurs in the environment where the microphone circuit package is located by arranging the oil leakage detection pin on the microphone circuit package, while arranging the detection circuit in the microphone circuit package, so that not only change of the equivalent resistance and/or equivalent voltage can be detected, but also it is ensured that the microphone circuit is controlled to stop operation according to the change of the equivalent resistance and/or equivalent voltage, thereby preventing safety accidents caused due to still powering on of the electronic product in the case of oil leakage, and reducing potential safety hazards of the electronic product.

As compared to various oil leakage detection ways in the prior art, the technical method of the present invention is more reliable, and greatly improves safety of the microphone circuit, thereby further improving safety of the electronic product using the microphone circuit.

Moreover, since the oil leakage detection pin OLD in the present invention is multiplexed with the charging pin CHG of the microphone circuit, it is unnecessary to add additional pins, and the microphone circuit can follow a structure of the six-pin package, thereby avoiding an increase of cost of the microphone circuit due to an increase of package size, thus, the oil leakage detection method and circuit in the present invention have large practicability, and are easy to promote and use.

It should be understood that, for those of ordinary skill in the art, the foregoing description can be modified or altered, and all such modifications and alterations fall into the scope of the attached claims of the present invention.

What is claimed is:

1. An oil leakage detection method of a microphone circuit, comprising:
   detecting, via an oil leakage detection pin arranged on a microphone circuit package, an equivalent resistance and/or equivalent voltage associated with an environment where the microphone circuit is located;
   determining whether the equivalent resistance and/or equivalent voltage exceeds a corresponding preset value through a detection circuit arranged in the microphone circuit package; and
   outputting a signal for stopping operation of the microphone circuit when the equivalent resistance and/or equivalent voltage exceeds the preset value.

2. The oil leakage detection method according to claim 1, wherein the step of detecting the equivalent resistance and/or equivalent voltage in the environment where the microphone circuit is located through the oil leakage detection pin arranged on the microphone circuit package comprises:

arranging the oil leakage detection pin on the microphone circuit package;
applying discontinuous or continuous electrical signals to the oil leakage detection pin; and
reading electrical signals fed back from the oil leakage detection pin through the detection circuit arranged in the microphone circuit package, so as to obtain the equivalent resistance and/or equivalent voltage in the environment where the microphone circuit package is located.

3. The oil leakage detection method according to claim 2, wherein the step of reading the electrical signals fed back from the oil leakage detection pin comprises:
   reading electrical signals between the oil leakage detection pin and ground; and/or
   reading electrical signals between the oil leakage detection pin and a power source.

4. The oil leakage detection method according to claim 1, wherein the step of determining whether the equivalent resistance and/or equivalent voltage exceeds the corresponding preset value comprises:
   determining whether the equivalent resistance and/or equivalent voltage exceeds the corresponding preset value by employing a voltage detection comparator or a current comparator.

5. A microphone circuit, comprising an oil leakage detection unit circuit that comprises:
   an oil leakage detection pin arranged on a microphone circuit package, the oil leakage detection pin being configured to detect an equivalent resistance and/or equivalent voltage in an environment where the microphone circuit package is located; and
   a detection circuit arranged in the microphone circuit package and electrically connected to the oil leakage detection pin, the detection circuit being configured to determine whether the equivalent resistance and/or equivalent voltage exceeds a corresponding preset value, and to output a signal for stopping operation of the microphone circuit when the equivalent resistance and/or equivalent voltage exceeds the preset value.

6. The microphone circuit according to claim 5, wherein the microphone circuit is configured to apply discontinuous or continuous electrical signals to the oil leakage detection pin.

7. The microphone circuit according to claim 5, wherein the detection circuit is a voltage detection comparator or a current comparator.

8. The microphone circuit according to claim 5, wherein the oil leakage detection pin is multiplexed with a charging pin on the microphone circuit package.

9. A microphone on which the microphone circuit according to claim 5 is arranged.

10. An electronic product on which the microphone according to claim 9 is arranged.

* * * * *